(12) United States Patent
Abad

(10) Patent No.: US 10,124,637 B2
(45) Date of Patent: Nov. 13, 2018

(54) TIRE TRACTION DEVICE

(71) Applicant: Gerard Abad, Montreal (CA)

(72) Inventor: Gerard Abad, Montreal (CA)

( * ) Notice: Subject to any disclaimer, the term of this patent is extended or adjusted under 35 U.S.C. 154(b) by 125 days.

(21) Appl. No.: 15/437,602

(22) Filed: Feb. 21, 2017

(65) Prior Publication Data

US 2017/0259632 A1    Sep. 14, 2017

(30) Foreign Application Priority Data

Mar. 12, 2016 (GB) .................................. 1604430.7

(51) Int. Cl.
*B60C 27/02* (2006.01)
*B60C 27/04* (2006.01)

(52) U.S. Cl.
CPC .......... *B60C 27/0269* (2013.01); *B60C 27/04* (2013.01)

(58) Field of Classification Search
CPC ... B60C 27/0269; B60C 27/04; B60C 27/023; B60C 27/0238; B60C 27/0261; B60C 27/045
USPC .......................... 152/216, 222, 218, 229, 230
See application file for complete search history.

(56) References Cited

U.S. PATENT DOCUMENTS

| | | |
|---|---|---|
| 1,499,036 A | 6/1924 | Weed |
| 1,508,547 A | 9/1924 | Gentle |
| 1,525,779 A | 2/1925 | King, Jr. |
| 1,530,622 A | 3/1925 | Roberts |
| 2,119,447 A | 5/1938 | Stahl et al. |
| 2,154,047 A | 4/1939 | Krider |
| 2,330,839 A | 10/1943 | O'Brien |
| 2,343,131 A | 2/1944 | Austin |
| 2,445,947 A | 7/1948 | Hoppes |
| 2,447,357 A | 8/1948 | Mosley |
| 2,449,033 A | 9/1948 | Younglove |
| 2,464,564 A | 3/1949 | Dunner |
| 2,474,262 A | 6/1949 | Linderme |
| 2,505,711 A | 4/1950 | Hughes |
| 2,507,090 A | 5/1950 | Brown |
| 2,518,170 A | 8/1950 | Otis |
| 2,524,973 A | 10/1950 | Hammond |
| 2,525,367 A | 10/1950 | Miller |
| 2,530,897 A | 11/1950 | Miller |
| 2,532,380 A | 12/1950 | Tschohl |
| 2,572,306 A | 10/1951 | Brewton |
| 2,607,389 A | 8/1952 | Bumbaugh |
| 2,610,665 A | 9/1952 | Schonert |
| 2,612,202 A | 9/1952 | Bumbaugh |
| 2,625,193 A | 1/1953 | La Rocca |

(Continued)

*Primary Examiner* — S. Joseph Morano
*Assistant Examiner* — Jean W Charleston

(57) ABSTRACT

A traction device attachable to a wheel having a rim to which a tire is mounted. The traction device includes first and second gripping elements facing each other, the second gripping element being longitudinally movable between an extended position and a retracted position, the first and second gripping elements being closer to each other in the retracted position than in the extended position. When the traction device is operatively mounted to the wheel with the second gripping element in the retracted position, the traction device extends across the tire thread and the first and second gripping elements grip the wheel therebetween at the rim, and, when the second gripping element is in the extended position, the traction device is removable from the wheel.

22 Claims, 2 Drawing Sheets

(56) References Cited

U.S. PATENT DOCUMENTS

| | | | |
|---|---|---|---|
| 2,625,194 A | 1/1953 | Westrate | |
| 2,646,834 A | 7/1953 | Rusch | |
| 2,649,885 A | 8/1953 | Brown | |
| 2,652,092 A | 9/1953 | Lantz | |
| 2,663,345 A | 12/1953 | Cardell | |
| 2,664,934 A | 1/1954 | Safran | |
| 2,694,432 A | 11/1954 | Lengyel | |
| 2,722,260 A | 11/1955 | Renwick, Sr. | |
| 2,738,820 A | 3/1956 | Browning | |
| 2,771,115 A | 11/1956 | Brown | |
| 2,775,993 A | 1/1957 | Young | |
| 2,808,094 A | 10/1957 | Marchionda | |
| 2,840,132 A | 6/1958 | Palmer | |
| 2,845,978 A | 8/1958 | McKenzie | |
| 2,871,903 A | 2/1959 | Minutilla | |
| 2,887,140 A | 5/1959 | Ralston | |
| 2,900,003 A | 8/1959 | Meech | |
| 2,953,182 A | 9/1960 | Brown | |
| 2,976,903 A | 3/1961 | Verdesca | |
| 3,047,037 A | 7/1962 | Frederick | |
| 3,068,925 A | 12/1962 | Stephens | |
| 3,103,242 A | 9/1963 | Manning | |
| 3,109,475 A | 11/1963 | Whitman | |
| 3,245,451 A | 4/1966 | Gellman | |
| 3,289,727 A | 12/1966 | Marks | |
| 3,291,180 A | 12/1966 | Gellman | |
| 3,736,970 A * | 6/1973 | Clark | B60C 27/04 152/226 |
| 3,861,437 A | 1/1975 | Belknap | |
| 4,192,367 A | 3/1980 | Chabot | |
| 4,235,272 A | 11/1980 | Landsrath | |
| 4,476,907 A | 10/1984 | Odawara | |
| 4,716,949 A | 1/1988 | Lee | |
| 4,747,437 A | 5/1988 | Magee | |
| 4,886,100 A * | 12/1989 | Parker, III | B60C 27/045 152/219 |
| 5,360,045 A | 11/1994 | Campbell | |
| 5,569,340 A | 10/1996 | Ulrich | |
| 6,053,227 A * | 4/2000 | Robeson | B60B 15/00 152/216 |
| 6,341,635 B1 * | 1/2002 | Robeson | B60B 15/266 152/210 |
| 2002/0079034 A1 | 6/2002 | Sood | |
| 2009/0314405 A1 * | 12/2009 | Heroux | B60C 27/04 152/225 C |

\* cited by examiner

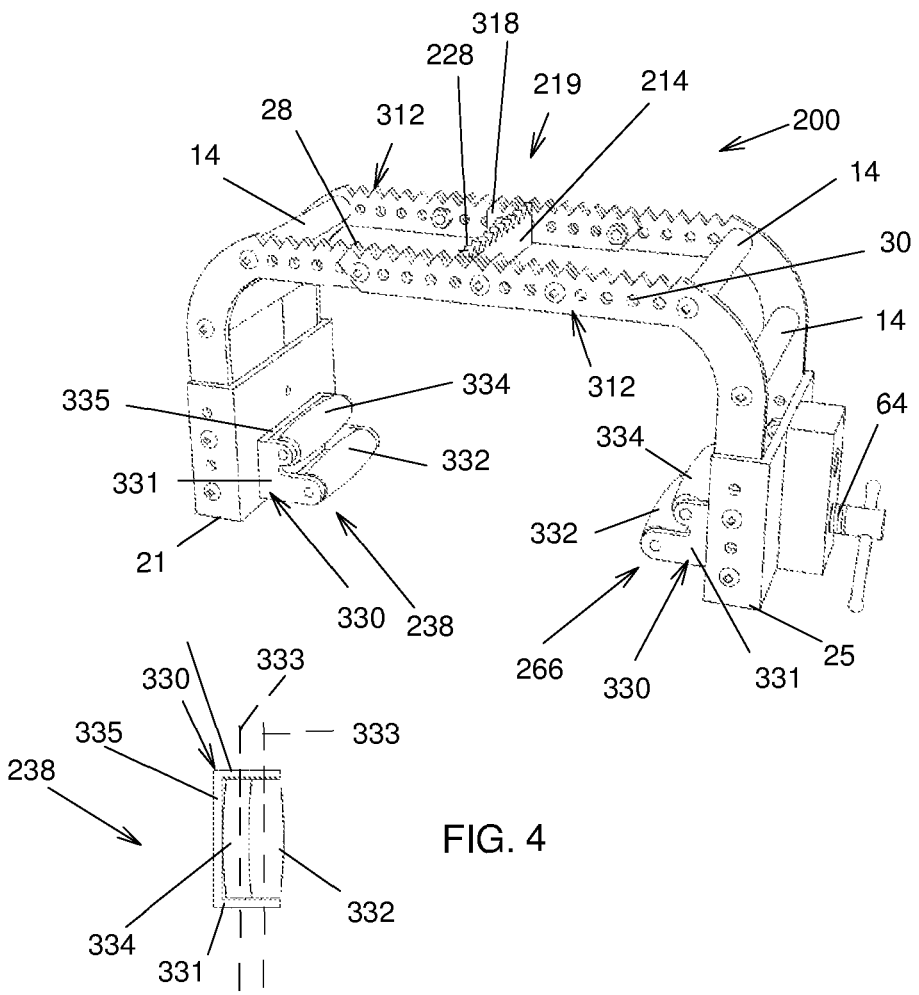
FIG. 3
FIG. 4
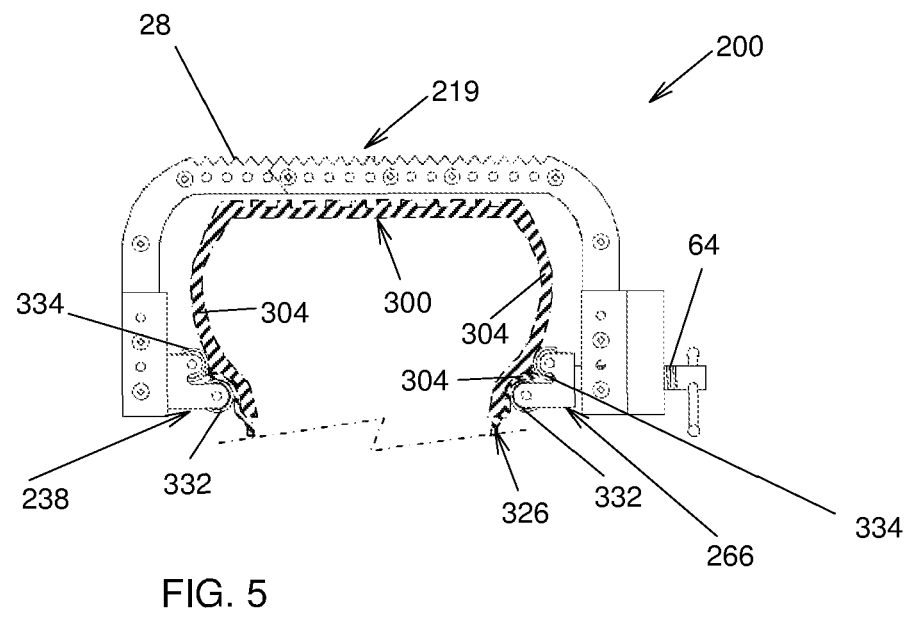
FIG. 5

TIRE TRACTION DEVICE

FIELD OF THE INVENTION

The present invention relates generally to motor vehicles and, more particularly, to a tire traction device.

BACKGROUND

Tire traction devices are used to improve traction of vehicles, such as cars and trucks, among others, in loose surfaces, such as snow or mud, and/or on slippery surfaces, such as ice. To be effective, the tire traction device needs to be solidly anchored to the wheel or tire of the vehicles. Tire mounted traction devices are tricky to install as the coupling force between the tire and the traction device must be balanced between large forces that securely secures the tire and traction device to each other and weaker forces that maintain integrity of the tire and of the tire/wheel coupling. Some wheel mounted traction devices exist but they require that the whole cross-section of the wheel and tire assembly be enclosed, which complexifies installation of the traction device, and which increases chances that the relatively fragile finish of fancier wheels will be damaged by the traction device.

In view of the above, there is a need in the industry for an improved tire traction device.

An object of the present invention is to provide such an improved tire traction device.

SUMMARY OF THE INVENTION

In a broad aspect, the present invention provides a traction device attachable to a wheel having a rim to which a tire is mounted, the tire defining a pair of substantially annular and substantially opposed tire side walls, the tire also defining a tire thread extending between the tire side walls, the traction device including: a first end portion defining substantially opposed first end portion inner and outer ends, the first end portion inner end being radially inwardly relative to the first end portion outer end when the traction device is operatively mounted to the wheel, the first end portion including a first gripping element at the first end portion inner end for gripping the wheel; a second end portion substantially longitudinally opposed to the first end portion and defining substantially opposed second end portion inner and outer ends, the second end portion inner end being radially inwardly relative to the second end portion outer end when the traction device is operatively mounted to the wheel, the second end portion including a second gripping element at the second end portion inner end for gripping the wheel; an intermediate portion extending substantially longitudinally between the first and second end portions at the first and second end portion outer ends; the first and second gripping elements facing each other substantially longitudinally opposed to each other, the second gripping element being longitudinally movable between an extended position and a retracted position, the first and second gripping elements being closer to each other in the retracted position than in the extended position. When the traction device is operatively mounted to the wheel with the second gripping element in the retracted position, the intermediate portion extends across the tire thread and the first and second gripping elements grip the wheel therebetween at the rim, and, when the second gripping element is in the extended position, the traction device is removable from the wheel.

The invention may also provide a traction device wherein the first gripping element defines a first gripping element contact surface contacting the wheel when the traction device is operatively mounted to the wheel, the first gripping element being substantially resiliently deformable at the first gripping element contact surface.

The invention may also provide a traction device wherein the second gripping element defines a second gripping element contact surface contacting the wheel when the traction device is operatively mounted to the wheel, the second gripping element being substantially resiliently deformable at the second gripping element contact surface.

The invention may also provide a traction device wherein the first gripping element contact surface defines a substantially elongated laterally extending groove thereinto receiving part of the rim when the traction device is operatively mounted to the wheel.

The invention may also provide a traction device wherein the groove has a substantially rounded L-shaped transversal cross-sectional configuration.

The invention may also provide a traction device wherein the first and second gripping elements are selectively mountable respectively to the remainder of the first and second end portions at at least two different distances respectively from the first and second end portion inner ends.

The invention may also provide a traction device wherein the second end portion is provided with at least one mounting aperture extending longitudinally therethrough, the mounting aperture being threaded, the second gripping element being mounted to a threaded rod threadedly engaging the mounting aperture, wherein rotating the threaded rod in the mounting aperture moves the second gripping element between the extended and retracted positions.

The invention may also provide a traction device wherein the second gripping element is mounted to the threaded rod through a longitudinally rotatable coupling allowing independent rotation of the second gripping element relative to the threaded rod.

The invention may also provide a traction device wherein a lever protrudes from the threaded rod substantially perpendicular thereto.

The invention may also provide a traction device wherein the first gripping element is static relative to the remainder of the first end portion.

The invention may also provide a traction device wherein the second end portion is provided with at least two mounting apertures each for selectively and alternatively threadingly receiving the threaded rod thereinto, the mounting apertures being differently distanced from the second end portion inner end.

The invention may also provide a traction device wherein at least one of the first and second gripping elements includes a roller rotatable about a roller rotation axis extending substantially laterally.

The invention may also provide a traction device wherein the first and second gripping elements each include a roller rotatable about a respective roller rotation axis extending substantially laterally.

The invention may also provide a traction device wherein the rollers are each substantially elongated along the roller rotation axis.

The invention may also provide a traction device wherein the rollers each very in diameter along the roller rotation axis with a maximal diameter portion being provided between two minimal diameter portions.

The invention may also provide a traction device wherein each of the first and second gripping elements includes a pair of rollers each rotatable about a respective roller rotation axis, the rollers within each pair of rollers being differently distanced from the first and second end portion inner ends.

The invention may also provide a traction device wherein the rollers from the first and second gripping elements closest respectively to the first and second end portion inner ends are longitudinally closer to each other than the rollers from the first and second gripping elements respectively furthest from the first and second end portion inner ends.

The invention may also provide a traction device wherein the longitudinal length of the intermediate portion is selectively adjustable.

The invention may also provide a traction device wherein the intermediate portion is provided with teeth facing away from the first and second end portions inner ends.

The invention may also provide a traction device wherein the traction device includes two substantially parallel body elements laterally spaced apart from each other and extending each in the first end, intermediate and second end portions, the two body elements being interlinked by linking members extending substantially laterally therebetween.

The invention may also provide a traction device wherein at least one of the linking members extends in the intermediate section and is provided with teeth facing away from the first and second end portions inner ends.

In another broad aspect, the invention provides a traction device and wheel assembly, including: a wheel having a rim to which a tire is mounted, the tire defining a pair of substantially annular and substantially opposed tire side walls, the tire also defining a tire thread extending between the tire side walls; and a traction device mounted to the wheel and including: a first end portion defining substantially opposed first end portion inner and outer ends, the first end portion inner end being radially inwardly relative to the first end portion outer end, the first end portion including a first gripping element at the first end portion inner abutting against the wheel; a second end portion substantially longitudinally opposed to the first end portion and defining substantially opposed second end portion inner and outer ends, the second end portion inner end being radially inwardly relative to the second end portion outer end, the second end portion including a second gripping element at the second end portion inner end abutting against the wheel; and an intermediate portion extending substantially longitudinally between the first and second end portions at the first and second end portions outer ends and extending across the tire thread; the first and second gripping elements facing each other substantially longitudinally opposed to each other with the wheel therebetween, the second gripping element being longitudinally movable between an extended position and a retracted position, the first and second gripping elements being closer to each other in the retracted position than in the extended position; wherein, when the traction device is operatively mounted to the wheel with the second gripping element in the retracted position, the intermediate portion extends across the tire thread and the first and second gripping elements grip the wheel therebetween at the rim, and, when the second gripping element is moved to the extended position, the traction device is removable from the wheel.

Advantageously, in some embodiments, the traction device is substantially easily adjustable over a wide range of width and side wall height of a conventional tire wheel. In some embodiments, the traction device can be quickly and easily installed on, and removed from, a vehicle wheel. In some embodiments, the proposed traction device is also which is relatively simple and economical to manufacture.

The present application claims benefit from UK request application 1604330.7 filed Mar. 12, 2016, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 3, in a perspective view, illustrates another embodiment of a traction device, according to the present invention;

FIG. 4, in bottom plan view, illustrates a gripping element part of the traction device of FIG. 3; and FIG. 5, in a side elevational view, illustrates the traction device of FIG. 3, here shown mounted around a cross-section portion of a tire mounted on a wheel.

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 1:
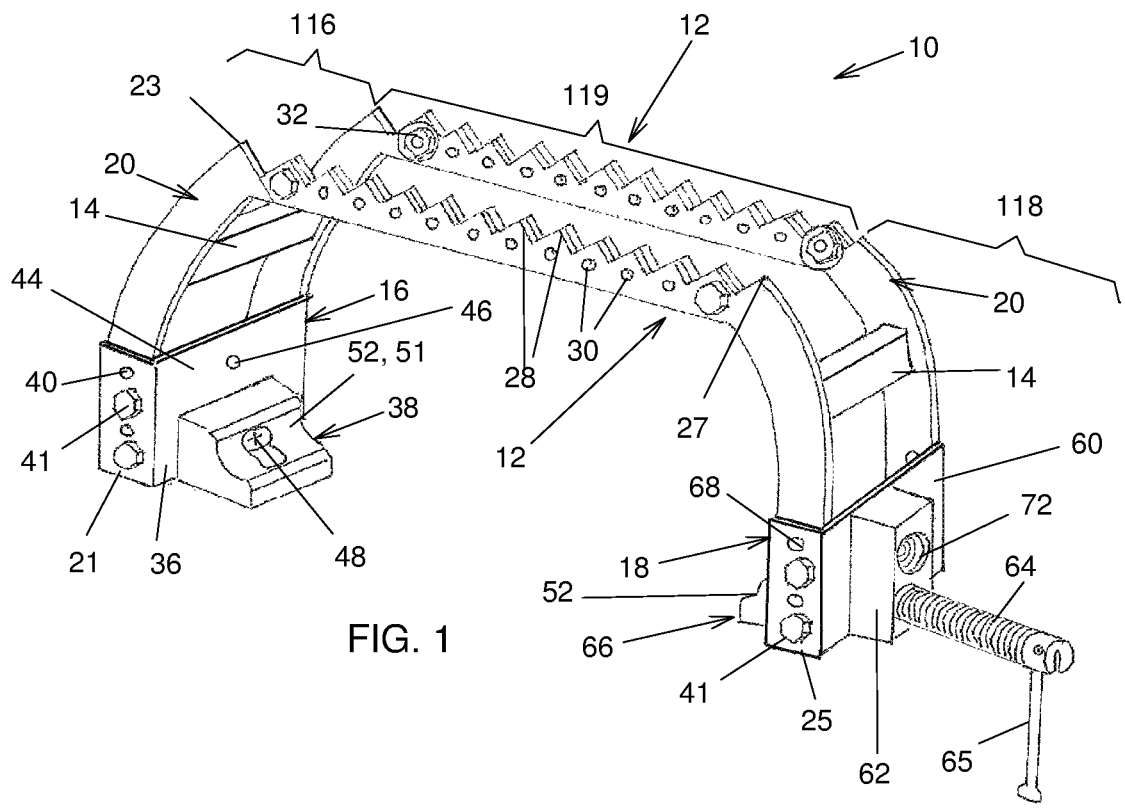
FIG. 1, in a perspective view, illustrates an embodiment of a traction device, according to the present invention.
Figure 2:
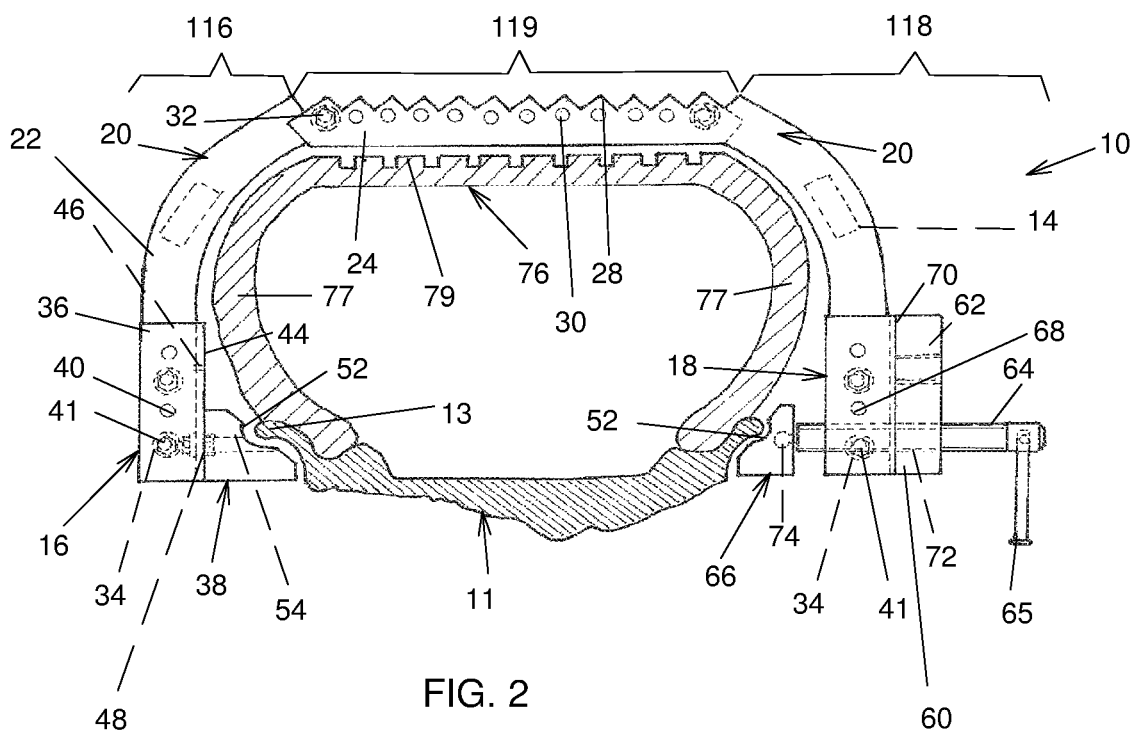
FIG. 2, in a side elevational view, illustrates the traction device of FIG. 1, here shown mounted around a cross-section portion of a tire mounted on a wheel.

FIGS. 1 and 2 show various aspects of an embodiment of a traction device 10 according to the present invention. As seen in FIG. 2, the traction device 10 is attachable to a wheel 11 (only partially shown in FIG. 2) having a rim 13 to which a tire 76 is mounted. The tire 76 defines a pair of substantially annular and substantially opposed tire side walls 77 and a tire thread 79 extending between the tire side walls 77.

The traction device 10 includes a first end portion 116, a second end portion 118 and an intermediate portion 119 extending therebetween. Directional terminology is used to simplify description of the proposed traction device 10 and refers to a typical orientation of the traction device 10 when operatively secured to the wheel 11. The longitudinal direction is a direction aligned between the first and second end portions 116 and 118, or across the tire thread 79, along the width of the tire 76. The inner/outer terminology refers to elements that are either radially inwardly (inner) our outwardly (outer) located relative to other elements along the radius of the wheel 11 and tire 76 assembly, which is defined also as the radial direction when referring to the wheel 11 and tire 76. Lateral refers to a direction perpendicular to the longitudinal and inner/outer direction, generally oriented along the circumference of the wheel 11 and tire 76. This convention is used for reference and convenience purposes and should not be used to restrict the scope of the claims unless explicitly required by the structure of a specific claim. Finally, the terminology "at" is used to denote elements that are provided on a specific location or adjacent thereto, only minimally spaced apart therefrom. For example, "at the end" denotes an object that is at the extremity, or adjacent to the extremity, slightly spaced apart therefrom.

Referring to FIG. 1, The first end portion 116 defines substantially opposed first end portion inner and outer ends 21 and 23. The first end portion inner end 21 is radially inwardly relative to the first end portion outer end 23 when the traction device 10 is operatively mounted to the wheel 11. The first end portion 116 includes a first gripping element 38 at the first end portion inner end 21 for gripping the wheel 11.

The second end portion 118 defines substantially opposed second end portion inner and outer ends 25 and 27. The second end portion inner end 25 is radially inwardly relative to the second end portion outer end 27 when the traction device 10 is operatively mounted to the wheel 11. The second end portion 118 includes a second gripping element 66 at the second end portion inner end 25 for gripping the wheel 11.

The intermediate portion 119 extends substantially longitudinally between the first and second end portions 116 and 118 at the first and second end portions outer ends 23 and 27.

The first and second gripping elements 38 and 66 face each other. The second gripping element 66 is longitudinally movable between an extended position (seen in FIG. 1) and a retracted position (seen in FIG. 2). The first and second gripping elements 38 and 66 are closer to each other in the retracted position than in the extended position. Typically the first gripping element 38 is static relative to the remainder of the first end portion 116. In other words, the first gripping element 38 is not moved independently from adjacent portions of the traction device 10 when the traction device 10 is in the process of being installed on the wheel 11. However, in alternative embodiments, the first gripping element 38 may also be longitudinally movable.

As seen in FIG. 2, when the traction device 10 is operatively mounted to the wheel 11 with the second gripping element 66 in the retracted position, the intermediate portion 119 extends across the tire thread 79 and the first and second gripping elements 38 and 66 grip the wheel 11 therebetween at the rim 13. When the second gripping element 66 is then moved to the extended position, the traction device is removable from the wheel 11.

The traction device 10 may be built with any suitable structure that allows suitable positioning and operation of the first and second gripping elements 38 and 66 and of the intermediate portion 119. In a non-limiting, but relatively simple and inexpensive to manufacture embodiment, and referring to FIG. 1, the traction device 10 includes two substantially parallel body elements 12 laterally spaced apart from each other and extending each in the first end, intermediate and second end portions 116, 118 and 119. The two body elements 12 are interlinked by linking members 14 extending substantially laterally therebetween. For example, the body elements 12 are substantially identical and each substantially U-shaped and are joined in a substantially parallelly spaced apart configuration through a pair of linking members 14 extending between oppositely facing corner portions thereof.

The traction device 10 further generally includes a pair of end assemblies, namely first end assembly 16 and second end assembly 18 respectively provided in the first and second end portions 116 and 118, that are attached to the body elements 12 at the first and second end portion inner ends 21 and 23. In some embodiments, the first and second end assemblies 16 and 18 are adjustably attached to the body elements 12, but this is not necessarily the case in other embodiments.

In some embodiments, each of the body elements 12 is made of a single piece of material. However, in alternative embodiments, Each body element 12 is, in turn, composed of a pair of substantially identical L-shaped members 20. The L-shaped members 20 are for example made of a suitably rigid flat bar stock that is bent substantially perpendicularly along a side edge thereof. Referring to FIG. 2, each L-shaped member 20 generally defines a tire side portion 22, in the first and second end portions 116 and 118, and a ground engaging portion 24, in the intermediate portion 119.

The tire side portion 22 has for example a slightly curved longitudinally inwardly facing edge that is generally corresponding to the slightly outwardly curved cross-section of a tire side wall 77. The ground engaging portion 24 is typically substantially rectilinear and, in some embodiments, is provided with teeth 28 facing away from the first and second end portions inner ends 21 and 23 in the intermediate portion 119, so that the teeth 28 face the ground when the wheel 11 is rotated so that the traction device 10 is between the ground surface and the wheel 11. For example, the teeth 28 are distributed along substantially the whole length of the ground engaging portion 24.

The teeth 28 are for example extending perpendicularly outwardly relative to the general longitudinal axis of the ground engaging portion 24 and have, for example, a pointed outer end for efficiently engaging a ground surface. Furthermore, the teeth 28 are typically equidistantly spaced apart relative to one another along the ground engaging portion 24.

In some embodiments, the longitudinal length of the intermediate portion 119 is selectively adjustable. To that effect, for example, each ground engaging portion 24 is provided with a plurality of through holes 30 that are for example, but not necessarily, corresponding in number to the adjacent teeth 28. Likewise the teeth 28, the plurality of through holes 30 are typically equidistantly distributed longitudinally along the ground engaging portion 24.

Thus, a pair of L-shaped members 20 may be adjustably joined to one another through their ground engaging portions 24, in a substantially parallel configuration with their tire side portions 22 longitudinally opposed to each other, to form one of the body elements 12.

The thus parallelly disposed ground engaging portions 24 of a pair of L-shaped members 20 are typically rigidly joined to one another through at least two fasteners, such as screw and nut combinations 32, secured through pairs of corresponding through holes 30 proximal the longitudinal ends thereof, or at any other suitable location.

The plurality of equidistantly corresponding through holes 30 in an assembled pair of L-shaped members 20 may be used to adjust the overall longitudinal length of a body element 12 which, in turn, define the length of the intermediate portion 119.

The tire side portion 22 of an L-shaped member 20 is also for example provided with at least two through holes 34 disposed adjacent the first and second end portion inner ends 21 and 25, at different distances therefrom. The through holes 34 are in register with correspondingly spaced apart through holes 40 provided through lateral portions of the first and second end assemblies 16 and 18 respectively, which will be described hereinafter.

First end assembly 16 generally includes a relatively short channel member 36 having a substantially C-shaped cross-section, and the first gripping element 38. Channel member 36 has through holes 40 distributed along each lateral side surfaces thereof. In some embodiments, the number of through holes 40 is larger than the number of through holes 34 to allow attachment of the channel member 36 at different distances from the first end portion inner end 21, which thus allows adjustment of the position of the first gripping element 38 along the first end portion 116. In other words, the first gripping element 38 is then selectively mountable to the remainder of the first end portion 116 at at least two different distances from the first end portion inner end 21. To that effect, two or more sets of through holes 40 are provided so that each set can be aligned with the through holes 34 provided along each tire side portion 22 of each L-shaped member 20, as described above.

Thus, the first end assembly 16 may be adjustably attached along the pair of parallelly disposed tire side portions 22 extending from an assembled traction device 10. The first end assembly 16 may be releasably attached to the tire side portions 22 using fasteners, for example conventional screw and nut combinations 41 engaged through pairs of through holes 34 and 40 respectively.

The laterally extending portion 44 of the channel member 36 is provided with one or more threaded holes 46 distributed along a substantially laterally central axis thereof. The threaded holes 46 are for adjustably attaching, along the surface of the laterally extending portion 44, the first gripping element 38 using a threaded screw 48 or an equivalent attachment.

The first gripping element 38 may be generally represented in some embodiments by a one-piece element configured for abuttingly engaging the laterally extending portion 44 of the channel member 36 and defining a first gripping element contact surface 51 contacting the wheel 11 when the traction device is operatively mounted to the wheel 11, and more precisely for firmly engaging a side portion of the rim 13. In a specific embodiment of the invention, the first gripping element contact surface 51 defines a substantially elongated laterally extending groove 52 thereinto receiving part of the rim 13 when the traction device 10 is operatively mounted to the wheel 11. However, other configurations of the first gripping element 38 that may securely engage the wheel 11 are within the scope of the invention.

For example, the groove 52 has a substantially rounded L-shaped transversal cross-sectional configuration, so that the innermost portion of the first gripping element 38 extends longitudinally inwardly to a greater extent than the outermost portion of the first gripping element 38.

In some embodiments, at least one or both of the first and second gripping elements 38 and 66 are substantially resiliently deformable where they contact the wheel 11. When this is the case for the first gripping element 38, the first gripping element 38 is substantially resiliently deformable at the first gripping element contact surface 51. To that effect, the first gripping element 38 may be made of a resilient, yet sufficiently rigid material such a hardened rubber, or the like, for firmly frictionally engaging a side portion of the rim 13 without damaging the surface of the latter.

Alternatively, the body of the first gripping element 38 may be made of a sufficiently rigid metal, with only the surface of the groove 52 and adjacent portions of the first gripping element 38 being covered with a suitably resilient sheet of material such as rubber, or an equivalent material, for firmly frictionally engaging a side portion of the rim 13, without damaging the surface of the wheel 11.

The first gripping element 38 is secured to the remainder of the traction device 10 in any suitable manner. For example, the first gripping element 38 is provided with a through hole 54 extending substantially centrally therethrough along the longitudinal direction. Through hole 54 is for adjustably fastening the first gripping element 38 to one of the threaded through holes 46 provided along the laterally extending portion 44 of the channel member 36 using, for example, a threaded screw 56 extending therethrough, among other possibilities.

The second end assembly 18 is similar to the first end assembly 16 and includes a second channel member 60, which is also substantially C-shaped, and the second gripping element 66. However, to allow movements of the second gripping element 66 during installation and removal of the traction device 10, the second end assembly 18 may also include a reinforcement member 62 and a threaded rod 64.

The channel member 60 of the second end assembly 18 is substantially similar in configuration and size as the channel member 36 described above. Likewise the channel member 36 described above, the channel member 60 has through holes 68 distributed along each lateral side surfaces thereof. The through holes 68 are positionable in register with corresponding through holes 34 provided along each tire side portion 22 of an L-shaped member 20, as described further above. Typically, the number and configuration of the through holes 68 is such that the second end assembly 18 may be also adjustably attached along the tire side portions 22 to allow adjustment of the position of the second gripping element 66 relative to the remainder of the traction device 10 so that the first and second gripping elements 38 and 66 face each other aligned with each other.

Furthermore, in some embodiments, the channel member 60 is adjustably attached to the tire side portions 22 such that its laterally extending portion 70 is longitudinally outwardly relative thereto. The purpose of the opposed orientation of the channel member 60, relative to the channel member 36 is to allow further movements of the second gripping element 66 longitudinally outwardly to facilitate removal and attachment of the traction device 10.

The outer surface of the laterally extending portion 70 of the channel member 60 is in some embodiments, but not necessarily, provided with an integrally joined reinforcement member 62 having one or more mounting apertures 72 extending longitudinally through both the reinforcement member 62 and the laterally extending portion 70. The mounting apertures 72 are typically threaded, either along part of their length or along their whole length.

The reinforcement member 62 is substantially laterally aligned along a central axis of the laterally extending portion 70. Furthermore, the longitudinal axes of the mounting apertures 72 are identically positioned relative the laterally extending portion 70 of the channel member 60, as are the through holes 46 relative to the laterally extending portion 44 of the channel member 36.

The threaded rod 64 threadedly engages selectively and alternatively one of the mounting apertures 72, which are differently distanced from the second end portion inner end 25. Rotation of the threaded rod 64 in the mounting aperture 72 is for example facilitated by a lever 65 protruding from the threaded rod 64 substantially perpendicular thereto. Rotating the threaded rod 64 in the mounting aperture 72 moves the second gripping element 66 between the extended and retracted positions.

The second gripping element 66 of the second end assembly 18 is substantially similar in configuration to the first gripping element 38 described above. A difference resides essentially in the provision of a longitudinally rotatable coupling between the longitudinally inwardmost end of the threaded rod 64 and the the second gripping element 66, allowing independent rotation of the second gripping element 66 relative to the threaded rod 64. For example, the longitudinally rotatable coupling may be represented by a ball and socket coupling 74, or equivalent. Thus, the threaded rod 64 is longitudinally rotatable relative to the second gripping element 66 so that the threaded rod can rotate even if the orientation of the second gripping element 66 is maintained fixed to allow proper engagement with the rim 13.

Thus, there has been described an embodiment of a traction device 10 that can be conveniently clamped about a peripheral portion of a wheel 11 on a vehicle. The traction device 10 of the present invention may be selectively adjusted to the width of the tire 76 and wheel 11 combination through the relative adjustment of the pairs of L-shaped members 20, as well as selectively adjusted to the height of a tire side wall 77 through the releasably positionable channel members 36 and 60, relative to their corresponding L-shaped members 20, and/or the releasably positionable first and second gripping elements 38 and 66, relative to their corresponding channel members 36 and 60 respectively.

Furthermore, the inverted assembly configuration of the channel member 60, relative to the channel member 36, allows the second gripping element 66 to be extended between the lateral wall portions of the channel member 60. Thus, the traction device 10 may be easily slipped about a tire 76 having a substantially bulging cross-section, as illustrated in FIG. 2.

in some embodiments, the traction device 10 may be advantageously made from conventional flat bar and C-channel stock that have been subjected to a rust-proof treatment, or may be made from any suitable rust-proof metals such as, for examples, aluminum, stainless steel, or a combination thereof.

A mode of usage of the traction device 10 of the present invention will now be described. In a first step, a user may use conventional tools such as, for example, a socket wrench and pliers, for selectively adjust the traction device 10 to the proper tire width and side wall height of typically a traction wheel 11 of a vehicle. In a second step, the user may move to a fully extended position the second gripping element 66 between the side wall portions of the channel member 60. In a third step, the user may then slip the traction device 10 about a peripheral portion of the concerned wheel 11 in a saddle-like configuration, as illustrated in FIG. 2. Finally, the user may position both the first and second gripping elements 38 and 66 such that their grooves 52 are substantially in register with the rim 13, followed with firmly tightening the threaded rod 64 with the lever 65 to move the second gripping element 66 to the retracted position such that the traction device 10 is firmly secured thereon. Removal of the traction device 10 from the wheel 11 proceeds by simply reversing the movement of the threaded rod 64 and removing the traction device 10 from the wheel 11 and tire 76 assembly.

FIGS. 3 to 5 illustrate various aspects of another embodiment of a traction device 200, according to the present invention. As can be observed through these figures, the traction device 200 is substantially similar in its general shape and proportions to the traction device 10. Therefore, only the major differences therebetween are described hereinbelow.

Referring to FIG. 3, one difference between the traction devices 10 and 200 resides in the configuration of the first and second gripping elements 238 and 266. Instead of being made of a block of material, the first and second gripping elements 238 and 266 each includes a body 330 supporting at least one roller. For example, and non-limitingly, each body 330 supports two respective rollers 332 and 334 so that each roller 332 and 334 is rotatable about a respective roller rotation axis 333, seen in FIG. 4, extending substantially laterally. For example, the body 330 has a pair of substantially laterally opposed substantially C-shaped lateral walls 331, between which the rollers 332 and 334 are mounted, and a mounting wall 335 extending therebetween and mounted to the remainder of the traction device 200, for example using suitably positioned apertures and fasteners extending therethrough. As in the traction device 10, the second gripping element 266 is rotatable about the threaded rod 64. Typically, the rollers 332 and 334 are supported in a parallelly spaced apart relationship, but other orientations are within the scope of the invention. It should be noted that in alternative embodiments, only one of the first and second gripping elements 238 and 266 is provided with one or more rollers 332 and 334, the other one of the first and second gripping elements 238 and 266 having a structure similar to that of the corresponding first or second gripping elements 38 or 66 from the traction device 10.

Furthermore, as best illustrated in FIG. 3, rollers 332 and 334 within each of the first and second gripping elements 238 and 266 are at different distances from the first and second portion inner ends 21 and 25. Also, in some embodiments and as illustrated, the rollers 332 from the first and second gripping elements 238 and 266 closest to the first and second end portion inner ends 21 and 25 are longitudinally closer to each other than the rollers 334 from the first and second gripping elements 238 and 266 furthest from the first and second end portion inner ends 21 and 25. Thus, as seen in FIG. 5, the relative position of rollers 332 and 334 substantially conforms to a typical cross-section shape configuration at the junction between an edge portion of a wheel 326 and a rubber tire sidewall 304, with the peripheral rim 328 of the wheel 326 allowed to substantially freely engage between the two rollers 332 and 334.

In some embodiments, the rollers 332 and 334 are each substantially elongated along the roller rotation axis 333. However, shorter rollers 332 and 334 are also within the scope of the invention, as are groups of laterally spaced apart shorter rollers replacing each of the rollers 332 and 334. Also, in some embodiments, the rollers 332 and 334 each very in diameter along the roller rotation axis 333. For example, as seen in FIG. 4, each of the rollers 332 and 334 has a maximal diameter portion provided between two minimal diameter portions so that the rollers 332 and 334 each have a diameter that is at least slightly greater at their lateral center than at their opposed lateral ends. This configuration improves the attachment of the traction device 10 to the wheel 312.

Further, in some embodiments, the rollers 332 and 334, and optionally at least selected portions of the lateral walls 331, are covered with a suitable resilient material such as rubber or the like, for preventing any surface damage to the wheel 326 or rubber tire 300, as well as enhancing the adherence of the rollers 332 and 334 on opposed side portions the vehicle wheel 326.

Thus, the rotatability and slightly greater central diameter of each roller 332 and 334, in cooperation with the resilient material covering their outer surfaces, provides an enhanced penetrating and gripping force on adjacent portions of the junction of a wheel 326 with a rubber tire 300 when the traction device 200 is firmly clamped on each side of a the wheel 326, as illustrated in FIG. 5.

Returning to FIG. 3, another difference between the traction device 200 and the traction device 10 described further above resides in that a larger number of linking members 14 are provided to provide relatively more structural robustness to the overall assembly of the traction device 200 when required.

In addition, one or more of the linking member 214 may be provided in the intermediate portion 219 to engage the ground when the traction device 10 abuts against the ground. Each linking member 214 extends generally laterally and may be either integrally formed, fixedly secured for example through soldering, or removably attached to the body elements 212. In some embodiments, as seen in FIG. 3, the linking members 214 are removably attached to the body elements 212 through flanges 318 (only one of which is seen in FIG. 3) each including a suitable through-hole configured, positioned and sized to receive a suitable fastener to be inserted in the through-holes 30. The linking members 214 may be provided with laterally spaced apart teeth 228, for example distributed along most or all of the lateral extension of the linking member 214, and facing outwardly, away from the tire 300. It is to be noted that other shape configurations for the linking members 214 are also possible.

Thus, the additional traction force provided by the teeth 228 of the linking member 214 at a perpendicular orientation relative to the teeth 228 of the body elements 212 may help prevent a vehicle wheel 326 equipped with the traction device 200 of the present invention from slipping sideways on an ice surface.

This additional sideways traction force may be highly advantageous in situations where a vehicle having its driven vehicle wheels 326 equipped with one or more traction devices 200 lies on an icy surface leaning at a slight lateral angle relative to the vehicle, particularly when rotary power is applied to these vehicle wheels.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A traction device attachable to a wheel having a rim to which a tire is mounted, the tire defining a pair of substantially annular and substantially opposed tire side walls, the tire also defining a tire thread extending between the tire side walls, the traction device comprising:
   a first end portion defining substantially opposed first end portion inner and outer ends, the first end portion inner end being radially inwardly relative to the first end portion outer end when the traction device is operatively mounted to the wheel, the first end portion including a first gripping element at the first end portion inner end for gripping the wheel;
   a second end portion substantially longitudinally opposed to the first end portion and defining substantially opposed second end portion inner and outer ends, the second end portion inner end being radially inwardly relative to the second end portion outer end when the traction device is operatively mounted to the wheel, the second end portion including a second gripping element at the second end portion inner end for gripping the wheel; and
   an intermediate portion extending substantially longitudinally between the first and second end portions at the first and second end portion outer ends;
   the first and second gripping elements facing each other substantially longitudinally opposed to each other, the second gripping element being longitudinally movable between an extended position and a retracted position, the first and second gripping elements being closer to each other in the retracted position than in the extended position;
   wherein, when the traction device is operatively mounted to the wheel with the second gripping element in the retracted position, the intermediate portion extends across the tire thread and the first and second gripping elements grip the wheel therebetween at the rim, and, when the second gripping element is in the extended position, the traction device is removable from the wheel.

2. The traction device as defined in claim 1, wherein the first gripping element defines a first gripping element contact surface contacting the wheel when the traction device is operatively mounted to the wheel, the first gripping element being substantially resiliently deformable at the first gripping element contact surface.

3. The traction device as defined in claim 2, wherein the second gripping element defines a second gripping element contact surface contacting the wheel when the traction device is operatively mounted to the wheel, the second gripping element being substantially resiliently deformable at the second gripping element contact surface.

4. The traction device as defined in claim 2, wherein the first gripping element contact surface defines a substantially elongated laterally extending groove thereinto receiving part of the rim when the traction device is operatively mounted to the wheel.

5. The traction device as defined in claim 4, wherein the groove has a substantially rounded L-shaped transversal cross-sectional configuration.

6. The traction device as defined in claim 1, wherein the first and second gripping elements are selectively mountable respectively to the remainder of the first and second end portions at at least two different distances respectively from the first and second end portion inner ends.

7. The traction device as defined in claim 1, wherein the second end portion is provided with at least one mounting aperture extending longitudinally therethrough, the mounting aperture being threaded, the second gripping element being mounted to a threaded rod threadedly engaging the mounting aperture, wherein rotating the threaded rod in the mounting aperture moves the second gripping element between the extended and retracted positions.

8. The traction device as defined in claim 7, wherein the second gripping element is mounted to the threaded rod through a longitudinally rotatable coupling allowing independent rotation of the second gripping element relative to the threaded rod.

9. The traction device as defined in claim 7, wherein a lever protrudes from the threaded rod substantially perpendicular thereto.

10. The traction device as defined in claim 7, wherein the first gripping element is static relative to the remainder of the first end portion.

11. The traction device as defined in claim 7, wherein the second end portion is provided with at least two mounting apertures each for selectively and alternatively threadingly receiving the threaded rod thereinto, the mounting apertures being differently distanced from the second end portion inner end.

12. The traction device as defined in claim 1, wherein at least one of the first and second gripping elements includes a roller rotatable about a roller rotation axis extending substantially laterally.

13. The traction device as defined in claim 1, wherein the first and second gripping elements each include a roller rotatable about a respective roller rotation axis extending substantially laterally.

14. The traction device as defined in claim 13, wherein the rollers are each substantially elongated along the roller rotation axis.

15. The traction device as defined in claim 14, wherein the rollers each very in diameter along the roller rotation axis with a maximal diameter portion being provided between two minimal diameter portions.

16. The traction device as defined in claim 13 wherein each of the first and second gripping elements includes a pair of rollers each rotatable about a respective roller rotation axis, the rollers within each pair of rollers being differently distanced from the first and second end portion inner ends.

17. The traction device as defined in claim 16, wherein the rollers from the first and second gripping elements closest respectively to the first and second end portion inner ends are longitudinally closer to each other than the rollers from the first and second gripping elements respectively furthest from the first and second end portion inner ends.

18. The traction device as defined in claim 1, wherein the longitudinal length of the intermediate portion is selectively adjustable.

19. The traction device as defined in claim 1, wherein the intermediate portion is provided with teeth facing away from the first and second end portions inner ends.

20. The traction device as defined in claim 1, wherein the traction device includes two substantially parallel body elements laterally spaced apart from each other and extending each in the first end, intermediate and second end portions, the two body elements being interlinked by linking members extending substantially laterally therebetween.

21. The traction device as defined in claim 20, wherein at least one of the linking members extends in the intermediate section and is provided with teeth facing away from the first and second end portions inner ends.

22. A traction device and wheel assembly, comprising:
a wheel having a rim to which a tire is mounted, the tire defining a pair of substantially annular and substantially opposed tire side walls, the tire also defining a tire thread extending between the tire side walls; and
a traction device mounted to the wheel and including:
a first end portion defining substantially opposed first end portion inner and outer ends, the first end portion inner end being radially inwardly relative to the first end portion outer end, the first end portion including a first gripping element at the first end portion inner abutting against the wheel;
a second end portion substantially longitudinally opposed to the first end portion and defining substantially opposed second end portion inner and outer ends, the second end portion inner end being radially inwardly relative to the second end portion outer end, the second end portion including a second gripping element at the second end portion inner end abutting against the wheel; and
an intermediate portion extending substantially longitudinally between the first and second end portions at the first and second end portions outer ends and extending across the tire thread;
the first and second gripping elements facing each other substantially longitudinally opposed to each other with the wheel therebetween, the second gripping element being longitudinally movable between an extended position and a retracted position, the first and second gripping elements being closer to each other in the retracted position than in the extended position;
wherein, when the traction device is operatively mounted to the wheel with the second gripping element in the retracted position, the intermediate portion extends across the tire thread and the first and second gripping elements grip the wheel therebetween at the rim, and, when the second gripping element is moved to the extended position, the traction device is removable from the wheel.

\* \* \* \* \*